United States Patent
Song et al.

(10) Patent No.: US 7,418,158 B2
(45) Date of Patent: Aug. 26, 2008

(54) METHOD AND APPARATUS FOR DETECTING FILM SOURCE USING FREQUENCY TRANSFORM

(75) Inventors: Byung-cheol Song, Suwon-si (KR); Jae-moon Jo, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 829 days.

(21) Appl. No.: 10/861,411

(22) Filed: Jun. 7, 2004

(65) Prior Publication Data

US 2004/0257476 A1     Dec. 23, 2004

(30) Foreign Application Priority Data

Jun. 21, 2003     (KR)     ............... 10-2003-0040479

(51) Int. Cl.
 *G06K 9/54*     (2006.01)
 *G06K 9/36*     (2006.01)
 *G06K 9/60*     (2006.01)
(52) U.S. Cl. .................................... 382/305; 382/276
(58) Field of Classification Search ................ 382/305, 382/236, 276, 280; 348/456, 457, 459, 96, 348/97, 14.15
See application file for complete search history.

(56) References Cited

U.S. PATENT DOCUMENTS 5,835,672 A * 11/1998 Yagasaki et al. ............. 386/111
5,872,600 A *  2/1999 Suzuki ........................ 348/459

* cited by examiner

*Primary Examiner*—Yon Couso
(74) *Attorney, Agent, or Firm*—Sughrue Mion, PLLC

(57) ABSTRACT

Provided is a method and apparatus for detecting a film source using Frequency Transform. The method includes: performing predetermined Frequency Transform on a predetermined reference pattern and storing a pattern of magnitudes of the resultant values of the predetermined Frequency Transform; receiving a predetermined number of similarity values that are measured between the same types of adjacent two fields of video including interlaced fields; performing predetermined Frequency Transform on the similarity values; and comparing magnitudes of the similarity values with the magnitudes of the predetermined reference pattern, and if differences between the magnitudes of the similarity values and the magnitudes of the predetermined reference pattern are within a predetermined range, determining the video as the film source.

18 Claims, 3 Drawing Sheets

METHOD AND APPARATUS FOR DETECTING FILM SOURCE USING FREQUENCY TRANSFORM

BACKGROUND OF THE INVENTION

This application claims the priority of Korean Patent Application No. 2003-40479, filed on Jun. 21, 2003, in the Korean Intellectual Property Office, the disclosure of which is incorporated herein in its entirety by reference.

FIELD OF THE INVENTION

The present invention relates to processing of a video signal, and more particularly, to method and apparatus for detecting in a frequency domain whether input video is a film source.

DESCRIPTION OF THE RELATED ART

Videos used for a film, a television (TV), a digital versatile disc (DVD), etc. have different frame structures. Film includes 24 progressive frames per second, and TV or DVD video includes 60 interlaced fields per second. Thus, 24 progressive frames per second should be transformed into 60 interlaced frames per second to telecast video produced for film. This transformation process is called a telecine, and a 3:2 pull-down method is used in the course of transformation of the film into national television system committee (NTSC) TV video.

FIG. 1 is a view for explaining a process of transforming 24 film frames per second into 60 fields per second using a 3:2 pull-down method. Referring to FIG. 1, a top field 111, a bottom field 112, and a top field 113 are extracted from a frame 110. A bottom field 121 and a top field 122 are extracted from a next frame 120. This process results in transforming 2 progressive frames into 5 interlaced fields. A bottom field 131, a top field 132, and a bottom field 133 are extracted from a frame 130, and then a top field and a bottom field are extracted from a next frame. As a result, 2 progressive frames are transformed into 5 interlaced fields.

In a case where a film source is transformed into 60 interlaced fields using the above-mentioned 3:2 pull-down method, top fields and bottom fields may be made into 60 progressive frames.

FIG. 2 is a view for explaining a process of transforming interlaced fields into progressive frames. Referring to FIG. 2, when a film source is transformed into video using a 3:2 pull-down method, top fields and bottom fields can be made into progressive frames prior to the execution of the 3:2 pull-down method. Thus, the improved quality video can be played, and scenes of the video in slow motion can be much more naturally played. Also, the film source can be stored as 24 frames per second not 60 fields per second, which prevents a waste of storage. However, a determination must be made as to whether input video is 3:2 pull down video or video divided into interlaced fields to perform different processes suitable for the types of the input video. The features of a film source must be detected from phase alternation line rate (PAL) or other video signals not from NTSC video signals.

There are two kinds of methods of determining whether input video is a film source according to the type of used information of the input video. First, there is a method of using Sum of Absolute Difference (SAD) patterns which are calculated between two fields (one frame) having the same feature every two field (one frame) time. Here, the period of the SAD patterns is 5. There is also a method of using a difference signal between current and previous SAD patterns which is calculated to obtain more periodic SAD patterns. Here, the difference signal has the period of 5.

Second, the patterns of features of motion between two fields are used. To be more specific, when the sum of motion vectors of blocks is added to the previous sum of motion vectors, the resultant value must be within a predetermined range. In addition, magnitudes of motions of pixels are calculated and summed to compute the magnitude of motion of the whole field, and compared with a digital pattern, i.e., a binary sequence, for example, "100010".

However, both of the two methods have difficulty obtaining periodic patterns accurately. Also, efficiency of the two methods varies depending on how to set a threshold value which is needed during transformation of the magnitude of motion of the whole field into a digital pattern.

SUMMARY OF THE INVENTION

The present invention provides a method and apparatus for determining whether an input video signal is a film source, depending on a transformation pattern in a frequency domain into which a feature value of an input video signal, for example, similarity information, is transformed to accurately determine a period of the transformation pattern.

According to an aspect of the present invention, there is provided a method of detecting a film source, comprising performing predetermined Frequency Transform on a predetermined reference pattern and storing a pattern of magnitudes of the resultant values of the predetermined Frequency Transform; receiving a predetermined number of similarity values which are measured between the same types of adjacent two fields of video comprising interlaced fields; performing predetermined Frequency Transform on the similarity values; and comparing magnitudes of the similarity values with the magnitudes of the predetermined reference pattern, and if differences between the magnitudes of the similarity values and the magnitudes of the predetermined reference pattern are within a predetermined range, determining the video as the film source.

According to another aspect of the present invention, there is provided an apparatus for detecting a film source, comprising a reference pattern storage which performs predetermined Frequency Transform on a predetermined reference pattern and stores a pattern of magnitudes of the resultant values of the predetermined Frequency Transform; a similarity value receiver which receives a predetermined number of similarity values that are measured between the same types of adjacent two fields of video comprising interlaced fields; a frequency transformer which performs predetermined Frequency Transform on the similarity values; and a determiner which compares magnitudes of the similarity values with the magnitudes of the predetermined reference pattern, and if differences between the magnitudes of the similarity values and the magnitudes of the predetermined reference pattern are within a predetermined range, determines the video as the film source.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE ILLUSTRATIVE, NON-LIMITING EMBODIMENTS OF THE INVENTION

Hereinafter, exemplary embodiments of the present invention will be described in detail with reference to the attached drawings.

Information on similarity between the same types of fields of video with interlaced fields is used to detect whether input video is a film source. In other words, information on similarity between adjacent top fields and on similarity between adjacent bottom fields is used. The similarity information includes SAD values, motion vector values, modes used in motion estimation, and so forth. The present invention takes the SAD values as an example of the similarity information but is not limited to this.

Figure 1:
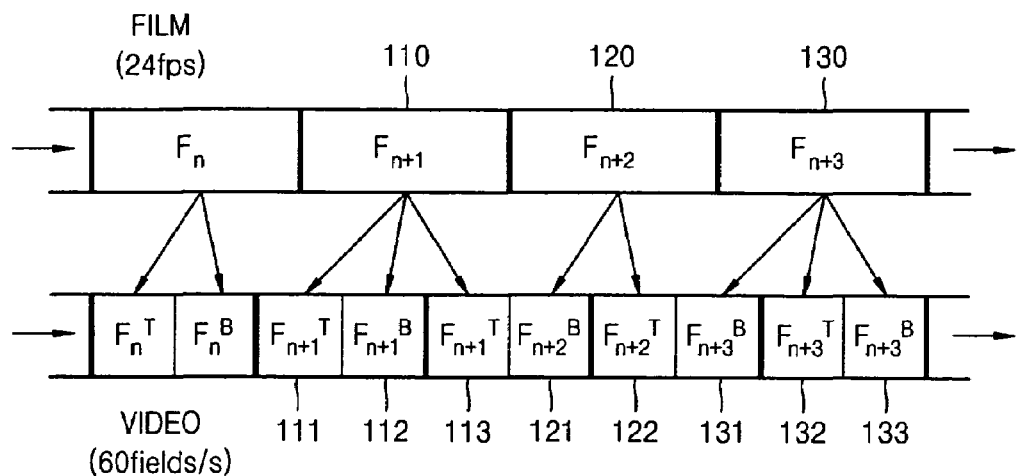
FIG. 1 is a view for explaining a process of transforming 24 film frames per second into 60 fields per second using a 3:2 pull-down method.
Figure 2:
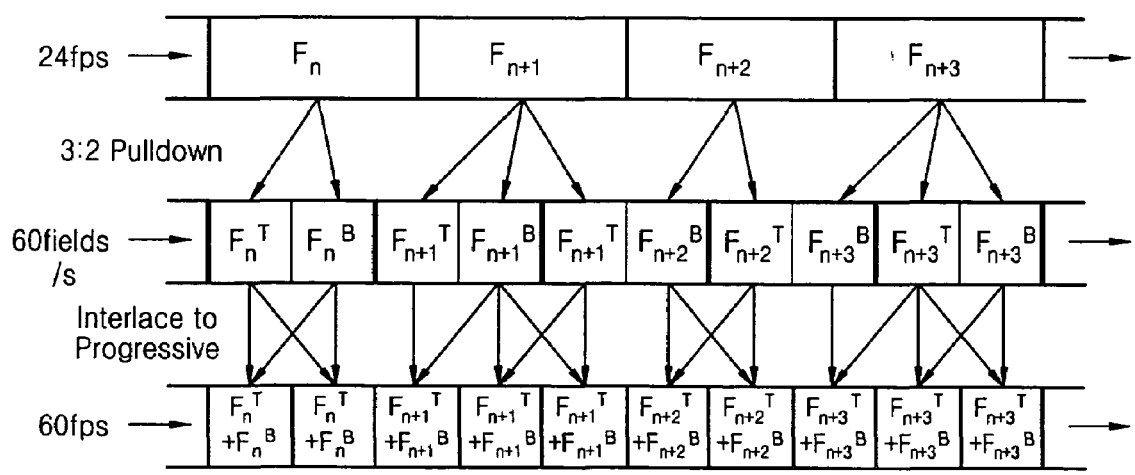
FIG. 2 is a view for explaining a process of transforming video with interlaced fields into video with progressive frames.
Figure 3:
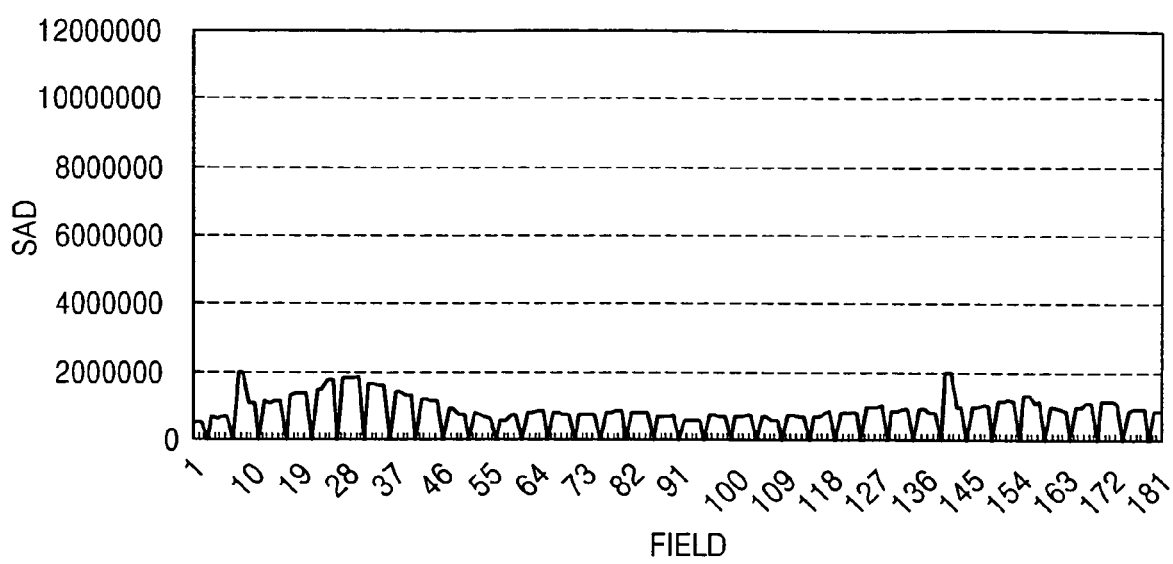
FIG. 3 is a graph for showing variations in a SAD value with respect to fields.

FIG. 3 is a graph for showing variations in a SAD value with respect to fields. As described with reference to FIG. 1, when a frame with top and bottom fields is input, a SAD value between the top fields and a SAD value between the bottom fields are separately calculated. 'SAD' refers to the sum of absolute values of differences in pixels between fields. As can be seen in FIG. 3, the calculated SAD values become small every specific period. SAD values in W fields including a field right prior to a current field are compared with a predetermined threshold value to obtain a predetermined binary pattern so as to determine the period of the SAD values. Here, W may be arbitrarily set. For example, when W is 10, a determination is made as to whether, of SAD values in 10 fields, a SAD value near to "0" appears every period of 5 to determine whether input video is a film source.

In the present invention, these SAD values are transformed into a frequency domain to determine, depending on the period of the frequency domain, whether input video is a film source.

Figure 4:
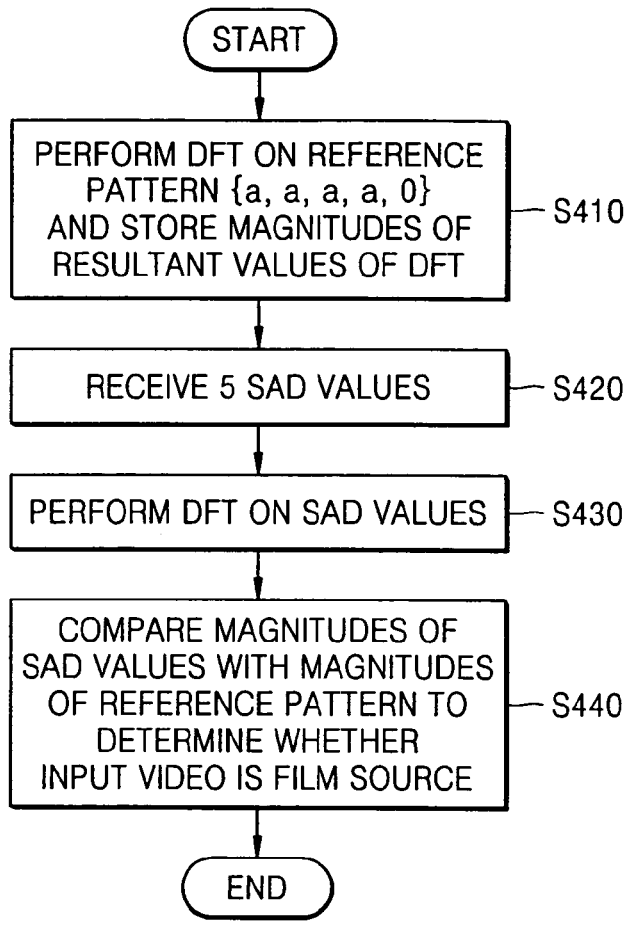
FIG. 4 is a flowchart for explaining a method of detecting a film source, according to an exemplary embodiment of the present invention.

FIG. 4 is a flowchart for explaining a method of detecting a film source, according to an exemplary embodiment of the present invention. Referring to FIG. 4, in step S410, Frequency Transform (FT) is performed on a reference pattern {a, a, a, a, 0} to store a pattern of the magnitudes of the resultant values of FT. In the present invention, FT is Discrete Fourier Transform (DFT). However, all types of Unitary Transform (UT) as well as DFT may be adopted. UT includes Discrete Cosine Transform (DCT), Discrete Sine Transform (DST), Discrete Walsh Transform (DWT), Discrete Hadamard Transform (DHT), Haar Transform, Slant Transform, Karhunen-Loeve (KL) Transform, and so on.

Since the reference pattern is periodic, the features of input video are determined depending on the cycle of input SAD values. For example, FT is performed on five SAD values to determine the period of the five SAD values depending on the magnitudes of the resultant values of FT.

When a received SAD value is x[n] ($0 \leq n < 5$), DFT can be performed on the received SAD value x[n] using Equation 1:

$$X[k] = \sum_{n=0}^{4} x[n] W_5^{kn}, \quad W_5^{kn} = e^{-j(2\pi kn/5)} \quad (1)$$

When the input video is the film source, one of 5 x[n] is a small value and another of 5 x[n] is a highly great value. DFT has a circular shift feature. For example, when the period of x[n] is 5, the relationship between x[n−m] and the resultant value of DFT is as shown in Equation 2:

$$X[(n-m)_5] \leftrightarrow e^{-j(2\pi kn/5)} X[k] \quad (2)$$

wherein the subscript "5" denotes the period. In view of the magnitude of the resultant value X[k] of DFT, the magnitudes of the resultant values of DFT performed on input values which have been shifted by m are equal to the magnitudes of the resultant values of DFT performed on the input values which were not shifted. Thus, a specific pattern having the period of 5 can be found out at an arbitrary point in time. This feature can be confirmed by performing DFT on values {a, a, a, a, 0} of input x[n]. When DFT is performed on x[n], values as shown in Equation 3 can be obtained.

$$X[0] = 4a$$

$$X[1] = a(1 + W_5^1 + W_5^2 + W_5^3) = 4aW1$$

$$X[2] = a(1 + W_5^2 + W_5^4 + W_5^6) = 4aW2$$

$$X[3] = a(1 + W_5^3 + W_5^6 + W_5^9) = 4aW3$$

$$X[4] = a(1 + W_5^4 + W_5^8 + W_5^{12}) = 4aW4 \quad (3)$$

wherein W1=(1+W51+W52+W53)/4, W2=(1+W52+W54+W56)/4, W3=(1+W53+W56+W59)/4, and W4=(1+W54+W58+W512)/4 which are constants. In a case of considering only the magnitudes of X[0], X[1], X[2], X[3], and X[4], values as seen in Equation 4 can be obtained.

$$\hat{X}[0] = |X[0]| = 4a$$

$$\hat{X}[1] = |X[1]| = 4a|W1|$$

$$\hat{X}[2] = |X[2]| = 4a|W2|$$

$$\hat{X}[3] = |X[3]| = 4a|W3|$$

$$\hat{X}[4] = |X[4]| = 4a|W4| \quad (4)$$

When the magnitudes of X[0], X[1], X[2], X[3], and X[4] are divided by the magnitude, 4a, of X[0], values as seen in Equation 5 can be obtained.

$$\hat{X}'[0] = 1$$

$$\hat{X}'[1] = |X[1]|/\hat{X}[0] = |W1|$$

$$\hat{X}'[2] = |X[2]|/\hat{X}[0] = |W2|$$

$$\hat{X}'[3] = |X[3]|/\hat{X}[0] = |W3|$$

$$\hat{X}'[4] = |X[4]|/\hat{X}[0] = |W4| \quad (5)$$

Accordingly, when 5 values having a predetermined period are input, DFT is performed on the 5 values. When only the magnitudes of the resultant values of DFT are considered, as seen in Equation 5, except the magnitude of X[0], the rest become predetermined constants.

Therefore, magnitudes of the resultant values of DFT performed on input SAD values are compared with the magnitudes of the resultant values of DFT performed on the reference pattern. The period of the input SAD values is determined depending on whether differences between the magnitudes are within a predetermined error. In step S420, a predetermined number of SAD values in each field of video are received. Here, the predetermined number is 5. In step S430, DFT is performed on the SAD values. In other words, DFT is performed on the SAD values using Equations 1 through 5 to calculate the magnitudes of the SAD values. In step S440, the magnitudes of the SAD values are compared with the magnitudes of the reference pattern. When differences between the magnitudes are within a predetermined range, the video is determined as a film source.

Figure 5:
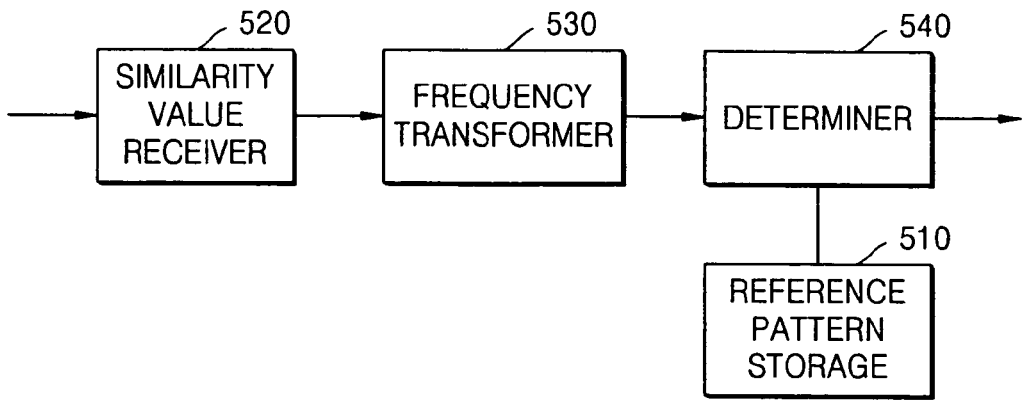
FIG. 5 is a block diagram of an apparatus for detecting a film source, according to an exemplary embodiment of the present invention.

FIG. 5 is a block diagram of an apparatus for detecting a film source, according to an exemplary embodiment of the present invention. Referring to FIG. 5, a reference pattern storage 510 stores a pattern of the magnitudes of the resultant values of FT performed on the reference pattern {a, a, a, a, 0}. For example, FT may be DFT as well as all types of UT.

A similarity value receiver 520 receives a predetermined number of similarity values which have been measured between the same types of adjacent two fields of video including interlaced fields. The similarity values may be 5 SAD values. A frequency transformer 530 performs FT on the SAD values. Here, FT is of the same type as that which has been performed on the reference pattern. A determiner 540 compares the magnitudes of the SAD values with the magnitudes of the reference pattern. When differences between the magnitudes of the SAD values and the magnitudes of the reference pattern are within a predetermined range, the determiner 540 determines the video as a film source.

As described above, in a method and apparatus for detecting a film source using FT, according to the present invention, FT can be performed on similarity information including SAD values. As a result, a film source can be efficiently detected based on a pattern period of the SAD values.

The invention can also be embodied as computer readable codes on a computer readable recording medium. The computer readable recording medium is any data storage device that can store data which can be thereafter read by a computer system. Examples of the computer readable recording medium include read-only memory (ROM), random-access memory (RAM), CD-ROMs, magnetic tapes, floppy disks, optical data storage devices, and carrier waves (such as data transmission through the Internet). The computer readable recording medium can also be distributed over network coupled computer systems so that the computer readable code is stored and executed in a distributed fashion.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A method of detecting a film source, comprising:
    receiving a predetermined number of similarity values which are measured between same types of adjacent two fields of video comprising interlaced fields and performing Frequency Transform on the similarity values; and
    determining whether the video is the film source, based on a period in frequency domain of the transformed similarity values.

2. The method of claim 1, wherein the similarity values are Sum of Absolute Difference values which refer to differences in pixels between the same types of adjacent two fields.

3. The method of claim 2, wherein the Frequency Transform is a Unitary Transform.

4. The method of claim 2, wherein the video is determined as the film source when the period of the Sum of Absolute Difference values is 5.

5. A method of detecting a film source, comprising:
    performing predetermined Frequency Transform on a predetermined reference pattern and storing a pattern of magnitudes of the resultant values of the predetermined Frequency Transform;
    receiving a predetermined number of similarity values which are measured between same types of adjacent two fields of video comprising interlaced fields;
    performing the predetermined Frequency Transform on the similarity values; and
    comparing magnitudes of the similarity values with the magnitudes of the predetermined reference pattern, and if differences between the magnitudes of the similarity values and the magnitudes of the predetermined reference pattern are within a predetermined range, determining the video as the film source.

6. The method of claim 5, wherein the similarity values are Sum of Absolute Difference values which refer to differences in pixels between the same types of adjacent two fields.

7. The method of claim 6, wherein the predetermined reference pattern is {a, a, a, a, 0}.

8. The method of claim 6, wherein the predetermined number is equal to a pattern period of Sum of Absolute Difference values that are measured when input video is the film source.

9. The method of claim 6, wherein the predetermined Frequency Transform is a Unitary Transform.

10. The method of claim 9, wherein the performance of the predetermined Frequency Transform on the similarity values comprises:
    performing Discrete Fourier Transform on the SAD values;
    calculating magnitudes of the resultant values of Discrete Fourier Transform; and
    dividing the calculated magnitudes by a predetermined value.

11. An apparatus for detecting a film source, comprising:
    a reference pattern storage device which performs predetermined Frequency Transform on a predetermined reference pattern and stores a pattern of magnitudes of the resultant values of the predetermined Frequency Transform;
    a similarity value receiver which receives a predetermined number of similarity values that are measured between same types of adjacent two fields of video comprising interlaced fields;
    a frequency transformer which performs the predetermined Frequency Transform on the similarity values; and
    a determiner which compares magnitudes of the similarity values with the magnitudes of the predetermined reference pattern, and if differences between the magnitudes of the similarity values and the magnitudes of the predetermined reference pattern are within a predetermined range, determines the video as the film source.

12. The apparatus of claim 11, wherein the similarity values are Sum of Absolute Difference values which refer to differences in pixels between the same types of the adjacent two fields.

13. The apparatus of claim 12, wherein the predetermined reference pattern is {a, a, a, a, 0}.

14. The apparatus of claim 12, wherein the similarity value receiver receives a predetermined number of Sum of Absolute Difference values, the predetermined number being equal to a pattern period of Sum of Absolute Difference values which are measured when input video is a film source.

15. The apparatus of claim 12, wherein the frequency transformer performs Unitary Transform on the received Sum of Absolute Difference values.

16. The apparatus of claim 15, wherein the frequency transformer performs Discrete Frequency Transform on the received Sum of Absolute Difference values, calculates magnitudes of the resultant values of Discrete Frequency Transform, and divides the calculated magnitudes by a predetermined value.

17. A computer-readable recording medium on which a program is recorded to execute the method of claim 1 in a computer.

18. A computer-readable recording medium on which a program is recorded to execute the method of claim 5 in a computer.

* * * * *